United States Patent
Gatto et al.

(10) Patent No.: US 9,778,093 B2
(45) Date of Patent: Oct. 3, 2017

(54) DETERMINING PRODUCT LENGTH FOR USE IN REGULATING TRANSACTIONS IN A SELF-CHECKOUT CONVEYER SYSTEM

(75) Inventors: John Joseph Gatto, Cary, NC (US); Terry J. Nisbet, Cary, NC (US)

(73) Assignee: Toshiba Global Commerce Solutions Holdings Corporation, Tokyo (JP)

(*) Notice: Subject to any disclaimer, the term of this patent is extended or adjusted under 35 U.S.C. 154(b) by 2986 days.

(21) Appl. No.: 11/616,072

(22) Filed: Dec. 26, 2006

(65) Prior Publication Data
US 2008/0154736 A1    Jun. 26, 2008

(51) Int. Cl.
G01G 15/00    (2006.01)
G06Q 20/20    (2012.01)
G07G 1/00    (2006.01)

(52) U.S. Cl.
CPC ........... G01G 15/00 (2013.01); G06Q 20/208 (2013.01); G07G 1/0063 (2013.01)

(58) Field of Classification Search
CPC combination set(s) only.
See application file for complete search history.

(56) References Cited

U.S. PATENT DOCUMENTS

| | | | |
|---|---|---|---|
| 3,716,697 A * | 2/1973 | Weir | 235/383 |
| 3,945,448 A * | 3/1976 | Sellers | 177/25.19 |
| 4,063,820 A | 12/1977 | Borgese | |
| 4,262,763 A | 4/1981 | Raskin | |
| 4,939,355 A | 7/1990 | Rando et al. | |
| 5,375,680 A * | 12/1994 | Ikeda et al. | 186/61 |
| 5,427,224 A * | 6/1995 | Suehara et al. | 198/396 |
| 5,635,679 A * | 6/1997 | Kohashi et al. | 177/25.13 |
| 5,679,941 A | 10/1997 | Iizaka et al. | |
| 5,990,422 A * | 11/1999 | Komori et al. | 177/25.11 |
| 6,049,386 A | 4/2000 | Stringer et al. | |
| 6,105,014 A * | 8/2000 | Ramsden et al. | 705/410 |
| 6,521,854 B2 | 2/2003 | Tanimoto | |
| 6,611,787 B2 | 8/2003 | Stringer et al. | |
| 6,837,428 B2 | 1/2005 | Lee et al. | |
| 6,909,106 B2 | 6/2005 | Ungpiyakul et al. | |
| 2005/0072603 A1 * | 4/2005 | Criscione et al. | 177/126 |
| 2008/0117055 A1 * | 5/2008 | Blake et al. | 340/572.7 |

* cited by examiner

Primary Examiner — Luna Champagne
(74) Attorney, Agent, or Firm — Yee & Associates, P.C.

(57) ABSTRACT

A vertical sensor array is placed along a weighing conveyer in a self-checkout system. Successive products are scanned and then placed on the weighing conveyer. As a product traverses the sensor array, a firmware control sends a measured height of the product to processor software, and also indicates the time taken by the product to pass the array. From the time, conveyer speed, and distance from the array to the end of the weighing conveyer, the software determines the time when the product will be transferred from the weighing conveyer to a location adjacent to the weighing conveyer. Since this transfer time is variable, depending on the product and the particular orientation of the product when it is placed on the weighing conveyer, the software can dynamically enable the scanner input device for the associated system to accept the next following product or item. The software can accurately determine the correct weight of a product, even when multiple products are present on the conveyer simultaneously.

20 Claims, 2 Drawing Sheets

DETERMINING PRODUCT LENGTH FOR USE IN REGULATING TRANSACTIONS IN A SELF-CHECKOUT CONVEYER SYSTEM

BACKGROUND OF THE INVENTION

1. Field of the Invention

The invention disclosed and claimed herein generally pertains to a method for validating a product or other object, wherein a sensor device such as a vertical array of sensors are used to determine product length. More particularly, the invention pertains to a method of the above type wherein products are successively scanned, and then moved through the sensor array by means of a weighing conveyer. Even more particularly, the invention pertains to a method of the above type that is useful in regulating or controlling transaction speed in a self-checkout conveyer system.

2. Description of the Related Art

There is increasing use of self-checkout systems, by stores and other commercial establishments that seek to handle large volumes of customers with greater efficiency and reduced costs. Such systems can be used with products of many types, provided that bar code labels or the like can be attached thereto, to accurately identify the product types or categories to which respective products belong. In existing self-checkout systems, a scanner is generally available, for use in scanning the bar code labels on each product that a shopper wishes to purchase. After a product is scanned, it is commonly placed on a scale-mounted conveyer, for movement and weighing.

As a product is moved by the weighing conveyer, two sets of sensors may be used to determine one or more product characteristics, and also to detect product motion. In a common arrangement, a front set of sensors comprises a front arch, or vertical array of opposing LEDs and light sensors. The front arch is positioned near the front of the weighing conveyer along the conveyer path of travel. As the conveyer moves the product through the front arch, the light of respective LEDs is blocked or broken, up to a level that indicates the height of the product. A firmware control used with the front arch delivers this height data to a system processor, which also receives product weight information from the weighing conveyer. Software in the processor then compares the height and weight information with reference height and weight information, respectively, for the type or category of product that is identified by the product bar code. The system thus provides two levels of security validation, to confirm that the product is indeed the type of product identified by its bar code. Such validation of a product may be necessary, before the scanner will be enabled to scan further products.

The second set of sensors is generally located toward the rear of the weighing conveyer. This rear set of sensors detects the product transiting off of the weighing conveyer and onto a transport conveyer, or onto some other off-load platform or site. The rear set of sensors frequently comprises a single pair of LEDs and light sensors, or a single flat sensor, and notifies the processor software, via the firmware control, when the product has been transited off of the weighing conveyer. A rear sensor of this type provides only a single break/make indication, that is, only a detection of the beginning and the end of the product as it moves along the conveyer.

In an arrangement using only a single pair of LEDs for the rear sensor, a problem can occur if the product moving along the weighing conveyer is of an irregular or odd shape. In this situation, the rear set of sensors will provide significantly different data than is provided by the front sensor, comprising a vertical LED array as described above. For example, if the product is a bowl, the front LED array will indicate a break sooner than the flat rear sensor will, because of the U-shaped configuration of the bowl. It has been found that software algorithms of the type that are currently used, in order to detect complete transfer of a product from the weighing conveyer to the transport conveyer, tend to be confused by the inconsistent data furnished by the front arch or LED array, and by the flat or single pair rear sensor configuration described above.

One solution to the above problem would be to use a rear arch at the end of the weighing conveyer, rather than a single pair of LEDs, wherein the rear arch was identical to the front arch. In this case, the data sent to the processor software by the firmware control would look the same for both front and rear arches, as a product passed through the respective arches. This configuration has been used in the past. However, it is desirable to avoid use of a second arch if possible, in order to reduce costs.

BRIEF SUMMARY OF THE INVENTION

In embodiments of the invention a vertical sensor array, such as a front arch as described above, is placed along a weighing conveyer in a system that may be used, for self-checkout of products or items. Successive products are scanned and then placed on the weighing conveyer. As a product traverses the front arch, a firmware control sends a measured height of the product to processor software, and also indicates the time taken by the product to pass completely through the arch. With this time information, the conveyer speed, and the distance from the end of the front arch to the end of the weighing conveyer, the software can determine the time when the product will be transferred from the weighing conveyer to a transport conveyer, or to other location immediately following the weighing conveyer. Since this transfer time is variable, depending on the product and the particular orientation of the product when it is placed on the weighing conveyer, the software can dynamically enable the scanner input device for the associated system to accept the next following product or item. Moreover, the software can accurately determine the correct weight of a product, even when multiple products are present on the conveyer simultaneously.

One embodiment is directed to a method for validating a specified object placed on a weighing conveyer that has a conveyer direction and a speed of movement, wherein the conveyer is disposed to move successive objects to an off-load site that is immediately adjacent to the end of the conveyer. The method comprises the step of moving the specified object on the conveyer past a sensor device located proximate to the conveyer, in order to measure the length of the specified object along the conveyer direction of movement. The measured length and the conveyer speed are selectively processed to compute the time when the specified object is at a particular location with respect to the conveyer, such as when the specified object has been transferred to the off-load site. The method further comprises acquiring weight data from the weighing conveyer that is associated with the specified object, and determining the weight of the specified object from the weight data and the computed time.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
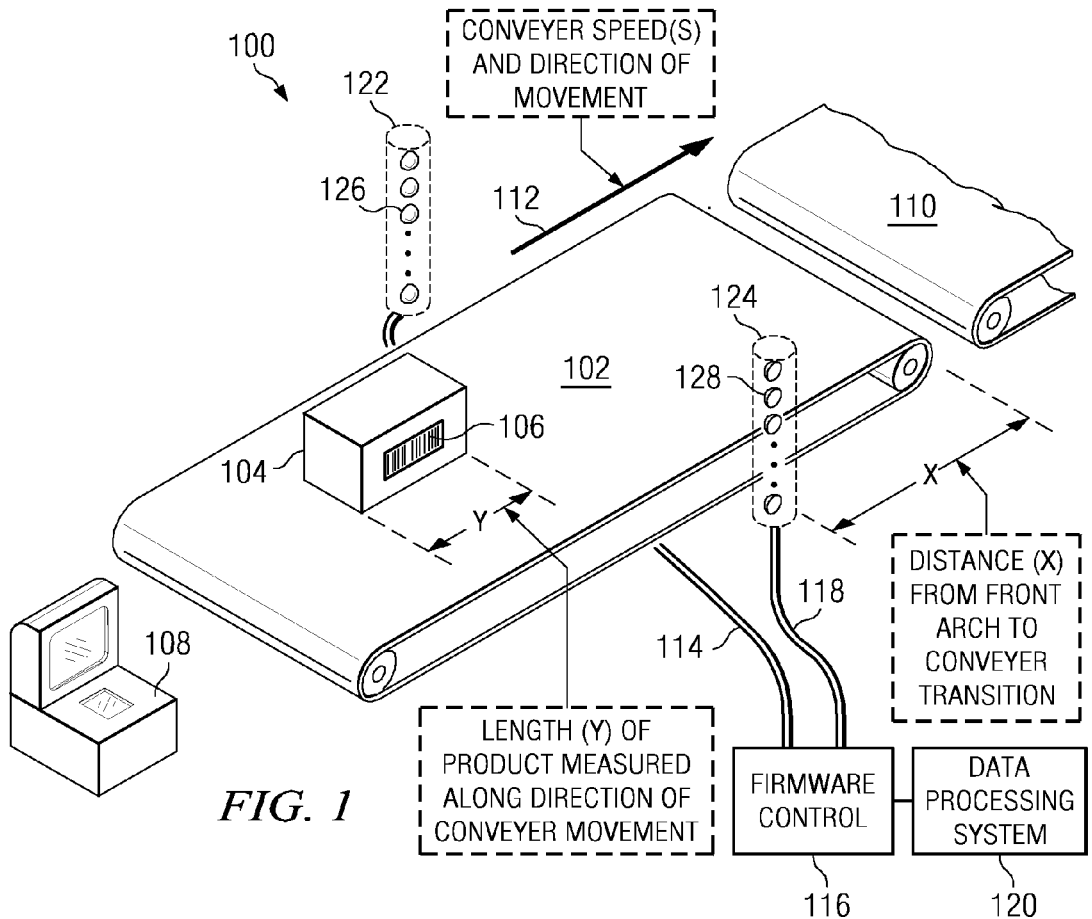
FIG. 1 is a schematic diagram illustrating an embodiment of the invention.

Referring to FIG. 1, there are shown respective components for a self-checkout system 100, which is configured to include an embodiment of the invention. System 100 is provided with a scale mounted weighing conveyer 102 for receiving, weighing and moving objects 104, which may be products, items or the like. System 100 may be used in stores that sell various kinds of merchandise, but the invention is not limited thereto. Generally, system 100 may be used to advantage wherever there is a need to automatically validate or affirm an object as belonging to a particular type, category or class of objects.

Typically, a scannable identifier such as a bar code label 106 is attached to each object 104, to be read by a bar code scanner 108. In one mode, scanner 108 is fixed in place ahead of conveyer 102, to automatically scan labels of respective objects as they are moved past the scanner before being placed on conveyer 102. In another mode, scanner 108 is a hand-held device that is operated by a user of system 100 to initially scan an object 104. The object is then placed on weighing conveyer 102, and moved toward the farther end of the conveyer, at a conveyer speed S and in the direction indicated in FIG. 1 by arrow 112. Upon reaching the farther end, the object is automatically transitioned or off-loaded to a site or location at the end of conveyer 102. In one useful arrangement, the off-loading site comprises a transport conveyer 110 or the like, for carrying the object 104 to a packaging area or other location.

Weighing conveyer 102 is mounted on a scale (not shown) which continually provides a signal indicating the total weight that is being carried by conveyer 102. This signal is coupled through a lead 114 to a firmware control 116. Thus, if object 104 is the only object or item on conveyer 102 at a particular time, the weight data furnished to firmware control 116 will be the weight of object 104. This weight, in turn, may be provided to a computer or data processing system 120 associated with system 100. The software of data processing system 120 can then compare the weight data with a reference weight, which is known to characterize objects or products of the same type that object 104 is believed or assumed to be. Accordingly, if the weight data provided by conveyer 102 for object 104 matches the reference weight data, one measure or level of validation is provided for object 104.

Referring further to FIG. 1, there is shown a gate or arch comprising vertical opposing arrays 122 and 124, wherein the arrays include light emitting diodes (LEDs) and corresponding light sensors. The two arrays are positioned on opposing sides of weighing conveyer 102, so that object 104 must pass between them as it moves along the conveyer. The arrays are provided with horizontally directed LEDs 126, and with corresponding light sensors 128 on the opposite side of conveyer 102. Respective LEDs are spaced apart vertically from one another, by incremental amounts. The light sensors are likewise vertically spaced apart from one another, to detect the horizontal beams of their corresponding LEDs. Thus, whenever an object such as object 104 passes between the arrays 122 and 124, some of the light beams will be interrupted or broken, until the object has completely passed between the arrays. Moreover, the vertical level of the highest LED beam to be broken, measured from the surface of conveyer 102, will indicate the height of the object passing between the arrays. It will be readily apparent that the indicated vertical height will vary, if the height of the object changes along the conveyer direction of motion. Object height data, as well as other information represented by the blocking or breaking of respective LED beams over a period of time, is sent from the vertical light sensor arrays to firmware control 116, through a lead 118. Processor 120 may compare the height data with reference height data, to further validate object 104 as being of a particular object type.

In accordance with an embodiment of the invention, and as described above, when the front portion of object 104 begins to pass between arrays 122 and 124, some of the LED beams are blocked, to define a "break". The break continues, until the rear most portion of object 104 has passed the arrays. When this happens, all LED beams become unbroken, to define a "make". It will be seen that the total time period between the break and make events is indicated by the sensor activation/deactivation data sent to firmware control 116 from the sensor arrays 122 and 124. Moreover, this time period is the total time required for object 104 to move past a particular location along conveyer 102, such as the space between arrays 122 and 124. Since the conveyer speed S is known, processor or processing system 120 can be operated to multiply the total time period by S, to provide the length Y of object 104 as measured along the direction of conveyer movement.

FIG. 1 indicates that the distance X along conveyer 102, from the arrays 122 and 124 to the end of the conveyer 102, is also known. Then, by using object length Y, distance X and conveyer speed S, processing system 120 can readily compute the time required for object 104 to travel the distance X, from the sensor arrays to the end of the conveyer 102, and to be transferred completely onto transport conveyer 110. Thus, the particular time that object 104 is transitioned from conveyer 102 to adjacent conveyer 110 can be determined. Moreover, by knowing the length Y of an object and conveyer speed S, the position of an object on conveyer 102 at any time after it passes between the sensor arrays 122-124 can be readily determined.

By providing the above capabilities, operational system 100 can be optimized. For example, as a first object is being carried by conveyer 102, breaking the front arch comprising the LED arrays and being validated for correct weight, a second object can be scanned and also placed on the conveyer 102. The weight changes that occur, which at times are the sum of both objects, are returned to the processing software from the firmware control 116. With the timing information provided by the vertical LED arrays, the software can accurately predict when the first object will be transferred off of the weighing conveyer, as described above. The processor 120 can then accurately validate the weight of the second object, since only the second object contributes to the weight then detected by weighing conveyer 102. It is to be appreciated that this arrangement eliminates the need for any sensor device at the end of weighing conveyer 102, in order to accurately determine when an object has been transitioned from the weighing conveyer 102 to the transport conveyer 110.

It will be readily apparent that some of the objects placed on conveyer 102 will be asymmetric, or of odd or irregular shape. An asymmetric object, as used herein, is an object that is not symmetric with respect to at least one of three rectangular axes passing through the center of the object. A frying pan with an elongated handle would be an example of an asymmetric object, and a rectangular cereal box would be an example of a symmetric object. As noted above, the height of certain objects can vary over the measured length of the object.

Moreover, it will be further apparent that the length of an object, as measured along the direction of conveyer travel, can vary for both symmetric and asymmetric objects, depending on the orientation of the object as it is placed on the weighing conveyer. Accordingly, processor 120 is usefully configured to provide a historical database, which keeps a record of height and length data acquired for succeeding objects or products of a particular type. Over time, the processor can use such information to determine the most common orientation of the product, when it is placed on the weighing conveyer. Such information can also be used to provide reference length and height data for use in validating objects of asymmetric types.

In a further embodiment, by knowing the particular time of transfer to transport conveyer 110, weight data provided by weighing conveyer 102 can be acquired, wherein the weight data represents total weight on conveyer 102 just before the particular time, and also just after the particular time. The difference between the two weight quantities will be the weight of object 104. This weight computation will be accurate, even if there are one or more other objects on conveyer 102 simultaneously with object 104.

Figure 2:
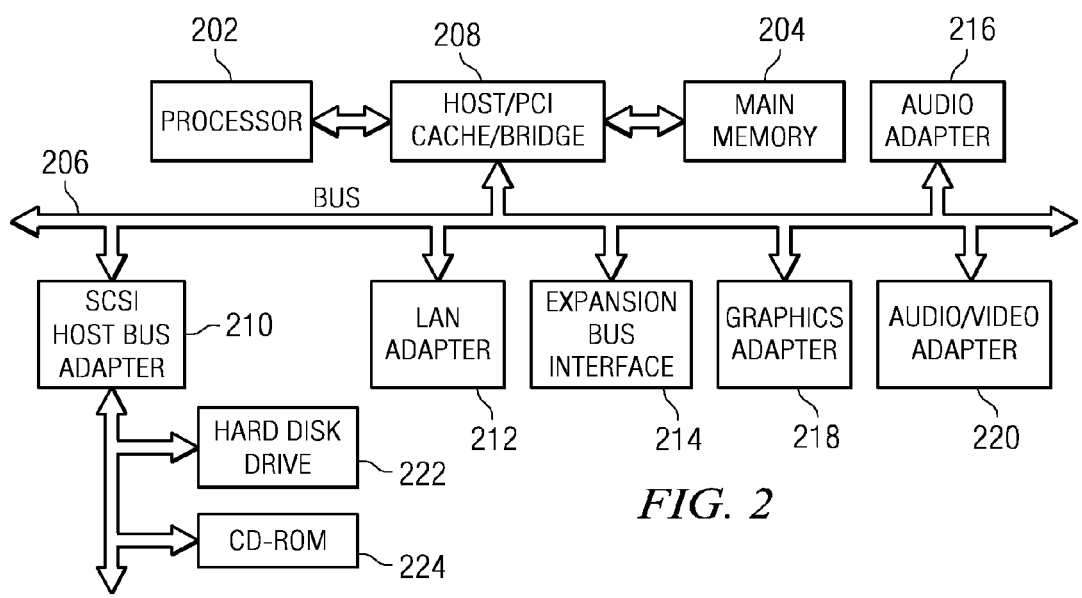
FIG. 2 is a block diagram illustrating a generalized computer or data processing system for use with the embodiment of FIG. 1.

Referring to FIG. 2, there is shown a block diagram depicting computer or data processing system 200, which may be used for processor 120. Computer system 200 usefully employs a peripheral component interconnect (PCI) local bus architecture, although other bus architectures may alternatively be used. FIG. 2 shows a processor 202 and main memory 204 connected to a PCI local bus 206 through a Host/PCI bridge 208. PCI bridge 208 also may include an integrated memory controller and cache memory for processor 202.

Referring further to FIG. 2, there is shown a local area network (LAN) adapter 212, a small computer system interface (SCSI) host bus adapter 210, and an expansion bus interface 214 respectively connected to PCI local bus 206 by direct component connection. Audio adapter 216, a graphics adapter 218, and audio/video adapter 220 are connected to PCI local bus 206 by means of add-in boards inserted into expansion slots. SCSI host bus adapter 210 provides a connection for hard disk drive 222, and also for CD-ROM drive 224.

An operating system runs on processor 202 and is used to coordinate and provide control of various components within computer system 200 shown in FIG. 2. The operating system may be a commercially available operating system such as Windows XP, which is available from Microsoft Corporation. Instructions for the operating system and for applications or programs are located on storage devices, such as hard disk drive 226, and may be loaded into main memory 204 for execution by processor 202.

Figure 3:
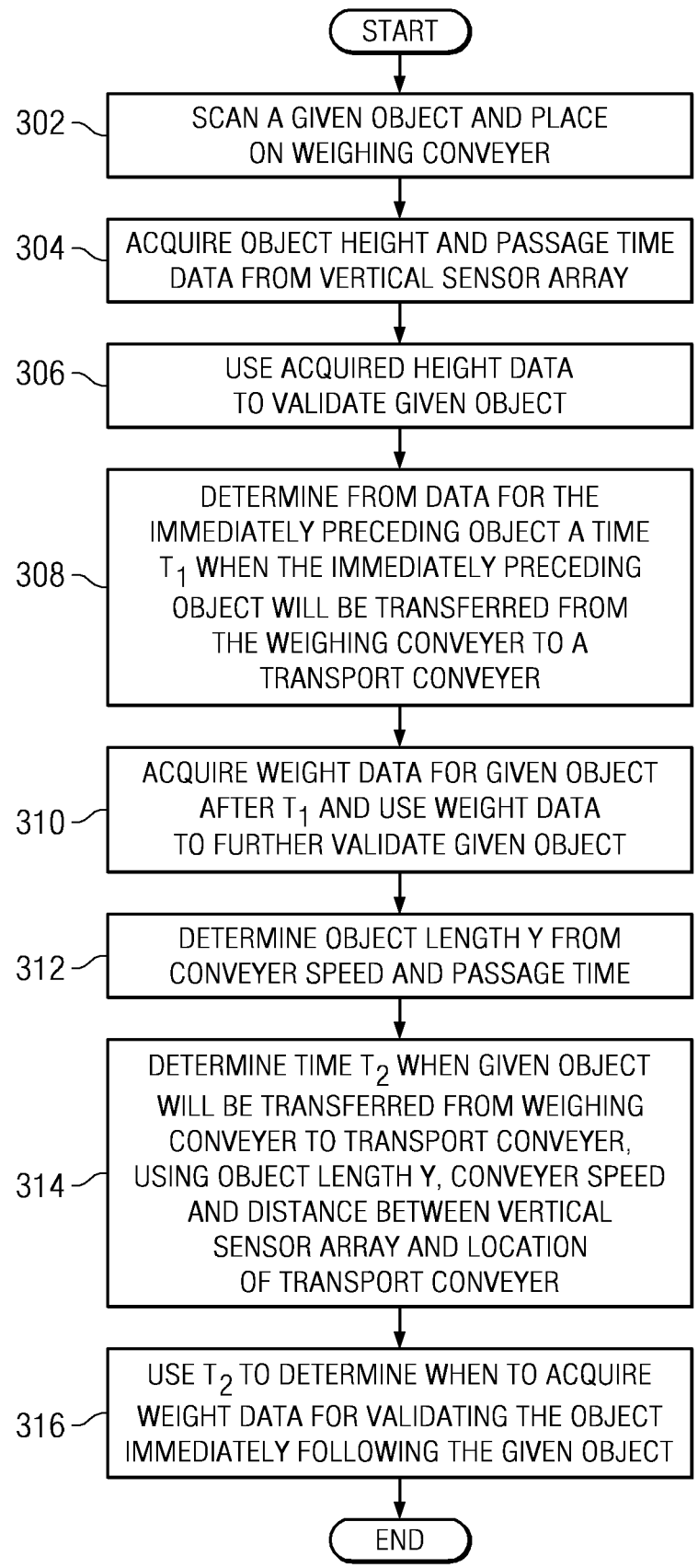
FIG. 3 is a flow chart depicting steps for an embodiment of the invention.

Referring to FIG. 3, there is shown a flow chart summarizing steps for a method comprising an embodiment of the invention. The method commences at step 302 by scanning a given object 104, and placing the object on a weighing conveyer 102. At step 304, vertical sensor arrays as described above are used to acquire height data for the object. The arrays are also used to determine the time required for the object to pass through the space between the arrays. The height data may be used to validate the object 104, as indicated by step 306.

Steps 308-310 indicate that a time $T_1$ can be determined, from data associated with the object that immediately preceded object 104 on weighing conveyer 102. $T_1$ is the time when the immediately preceding object is transferred from the weighing conveyer 102 to transport conveyer 110. Accordingly, right after time $T_1$, the weight of object 104 may be acquired from conveyer 102, since the total weight on the conveyer at such time will be the weight of object 104 only. The acquired weight may then be used to further validate object 104. By having the time $T_1$ available, delays in acquiring weight data for validating objects tends to be minimized. At step 312, the length Y of object 104 is determined, from conveyer speed and from the time required to pass the vertical arrays as described above. Step 314 shows determination of time $T_2$ from object length Y, from conveyer speed and from the distance between the vertical sensor arrays and the location of the transport conveyer 110. $T_2$ is the time when object 104 is transferred from weighing conveyer 102 to transport conveyer 110. Thus, $T_2$ may be used to determine when to acquire weight data for use in validating the object that immediately follows object 104, as shown by step 316 of FIG. 3.

The invention can take the form of an entirely software embodiment or an embodiment containing both hardware and software elements. In a preferred embodiment, the invention is implemented in software, which includes but is not limited to firmware, resident software, microcode, or the like.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for validating a first specified object placed on one weighing conveyer that has a conveyer direction and speed of movement, wherein the conveyer is disposed to move successive objects to an off-load site adjacent to a farther end of the conveyer, said method comprising the steps of:
scanning each object to identify reference data associated with a respective object scanned, wherein a second object immediately precedes the first specified object in the object succession, and the first specified object is placed on the conveyor when the preceding second object is also on the conveyor;
measuring a length and a vertical height of said preceding second object along said conveyer direction of movement by moving said preceding second object with respect to a single sensor device that is located proximate to said conveyer, wherein said single sensor device forms a gate comprising vertical opposing arrays through which an object conveyed must pass, and wherein said single sensor device is spaced a predetermined distance from said farther end of the conveyor;
selectively processing at least said measured length of said preceding second object and said conveyer speed, to compute a time when it has been determined that said preceding second object is transferred from said conveyer to said off-load site;
acquiring first weight data provided by said weighing conveyer, representing a total weight on said weighing conveyer just before said computed time when there are other objects on said weighing conveyer simultaneously with said second specified object, and second weight data representing a total weight on said weighing conveyer just after said computed time when there are other objects on said weighing conveyer simultaneously without said second specified object, wherein a difference between the first weight data and the second weight data is the weight of said second specified object;
determining whether the weight of said second specified object matches corresponding reference data associated with the respective object; and
responsive to a determination the weight of said second specified object matches corresponding reference data associated with the respective object, validating said second specified object.

2. The method of claim 1, wherein:
said computed time comprises the time when said preceding second object is transferred from said conveyer to said off-load site and said first specified object is the only object on said conveyor;
acquiring the weight data from said weighing conveyer that is associated with said first specified object; and
validating said first specified object using the weight data acquired from said weighing conveyor at said computed time and the reference data of said first specified object.

3. The method of claim 2, wherein:
said time of transfer is computed by selectively processing said measured length of said preceding second object, said conveyer speed, and the predetermined distance along said conveyer between said single sensor device and said farther end of the conveyer.

4. The method of claim 1, wherein:
measured length data for each object in a succession of asymmetric objects of a particular type, together with height data provided by said single sensor device for each object in said succession, is stored in a historical database, and is selectively processed to determine a most common orientation of objects of the particular type, when placed on said weighing conveyor.

5. The method of claim 4, wherein:
said determined weight of said first specified object is compared with reference weight data, in order to validate said first specified object as being of a particular object type.

6. The method of claim 1, wherein:
said single sensor device comprises an array of light emitting elements and corresponding light sensing elements, wherein said single sensor device provides information representing paths of light projected by said emitting elements that are respectively broken and not broken, as said first specified object is moved with respect to said sensor device.

7. The method of claim 6, wherein:
said array of light emitting and light sensing elements is configured to determine said vertical height of said first specified object at different locations along a measured length of said first specified object.

8. The method of claim 7, wherein:
height data provided by said array of light sensing and emitting elements is compared with reference height data, in order to validate said first specified object as being of a particular object type.

9. The method of claim 1, wherein:
measured length data for each object in a succession of asymmetric objects of a particular type, together with height data provided by said single sensor device for each object in said succession, is stored in a historical database, and is selectively processed to provide reference length data and reference height data for use in validating said asymmetric objects of said particular type.

10. The method of claim 1, wherein:
said first specified object is disposed to move along said conveyer at a same time that one or more other objects are being supported and moved by said conveyer.

11. A computer program product for validating a first specified object placed on one weighing conveyer that has a conveyer direction and speed of movement, wherein the conveyer is disposed to move successive objects to an off-load site adjacent to a farther end of the conveyer, said computer program product comprising computer executable instructions stored in a non-transitory computer readable medium, said computer executable instructions comprising:
  first instructions for scanning each object to identify reference data associated with a respective object scanned, wherein a second object immediately precedes the first specified object in the object succession, and the first specified object is placed on the conveyor when the preceding second object is also on the conveyor;
  second instructions for measuring a length and a vertical height of said preceding second object along said conveyer direction of movement by moving said preceding second object with respect to a single sensor device that is located proximate to said conveyor, wherein said single sensor device forms a gate comprising vertical opposing arrays through which an object conveyed must pass, and wherein said single sensor device is spaced a predetermined distance from said farther end of the conveyor;
  third instructions for selectively processing at least said measured length of said preceding second object and said conveyer speed, to compute a time when it has been determined that
  said preceding second object is transferred from said conveyer to said off-load site;
  fourth instructions for acquiring first weight data provided by said weighing conveyer, representing a total weight on said weighing conveyer just before said computed time when there are other objects on said weighing conveyer simultaneously with said second specified object, and second weight data representing a total weight on said weighing conveyer just after said computed time when there are other objects on said weighing conveyer simultaneously without said second specified object, wherein a difference between the first weight data and the second weight data is the weight of said second specified object
  fifth instructions for determining whether the weight of said second specified object matches corresponding reference data associated with the respective object; and
  sixth instructions responsive to a determination the weight of said second specified object matches corresponding reference data associated with the respective object, for validating said second specified object.

12. The computer program product of claim 11, wherein:
  said computed time comprises the time when said preceding second object is transferred from said conveyer to said off-load site; and said first specified object is the only object on said conveyor;
  acquiring the weight data from said weighing conveyer that is associated with said first specified object; and
  validating said first specified object using the weight data acquired from said weighing conveyor at said computed time and the reference data of said first specified object.

13. The computer program product of claim 12, wherein:
  said time of transfer is computed by selectively processing said measured length of said preceding second object, said conveyer speed, and the predetermined distance along said conveyer between said single sensor device and said farther end of the conveyer.

14. The computer program product of claim 11, wherein:
  said determined weight of said first specified object is compared with reference weight data, in order to validate said first specified object as being of a particular object type.

15. The computer program product of claim 11, wherein:
  height data provided by said single sensor device is compared with reference height data, in order to validate said specified first object as being of a particular object type.

16. Apparatus for validating a first specified object placed on one weighing conveyer that has a conveyer direction and speed of movement, wherein the conveyer is disposed to move successive objects to an off-load site adjacent to a farther end of the conveyer, said apparatus comprising:
  a bus;
  a memory connected to said bus;
  one or more storage devices connected to said bus;
  a scanner for scanning each object to identify reference data associated with a respective object scanned, wherein a second object immediately precedes the first specified object in the object succession, and the first specified object is placed on the conveyor when the preceding second object is also on the conveyor;
  a single sensor device, connected through a firmware control to said bus, located proximate to said conveyor, wherein said single sensor device forms a gate comprising vertical opposing arrays through which an object conveyed must pass, and wherein said single sensor device is spaced a predetermined distance from said farther end of the conveyor to provide data for use in measuring a length and a vertical height of said preceding second object along said conveyer direction of movement; when said preceding second object is moving with respect to said single sensor device;
  a device, connected to said bus, for acquiring first weight data provided by said weighing conveyer, representing a total weight on said weighing conveyer just before said computed time when there are other objects on said weighing conveyer simultaneously with said second specified object, and second weight data representing a total weight on said weighing conveyer just after said computed time when there are other objects on said weighing conveyer simultaneously without said second specified object, wherein a difference between the first weight data and the second weight data is the weight of said second specified object; and
  a processor device, connected to said bus, for selectively processing at least said measured length of said preceding second object and said conveyer speed, to compute a time when it has been determined that said preceding second object is transferred from said conveyer to said off-load site; determining whether the weight of said second specified object matches corresponding reference data associated with the respective object; and responsive to a determination the weight of said second specified object matches corresponding reference data associated with the respective object, validating said second specified object.

17. The apparatus of claim 16, wherein:
  said computed time comprises the time when said preceding second object is transferred from said conveyer to said off-load site and said first specified object is the only object on said conveyor;
  acquiring the weight data from said weighing conveyer that is associated with said first specified object; and
  validating said first specified object using the weight data acquired from said weighing conveyor at said computed time and the reference data of said first specified object.

18. The apparatus of claim 17, wherein:
said processor device computes said time of transfer from said measured length of said preceding second object, said conveyer speed, and the predetermined distance along said conveyer between said single sensor device and said farther end of the conveyer.

19. The apparatus of claim 16, wherein:
said single sensor device comprises an array of light emitting elements and corresponding light sensing elements, wherein said single sensor device provides information representing paths of light projected by said emitting elements that are respectively broken and not broken, as said first specified object is moved with respect to said single sensor device.

20. The apparatus of claim 19, wherein:
said array of light emitting and light sensing elements is configured to determine said vertical height of said first specified object at different locations along said measured length of said first specified object.

* * * * *